May 2, 1967

H. J. SEAMAN 3,316,822

COMBINED EARTH MOVER AND COMPACTOR

Filed March 12, 1964

INVENTOR.
HARRY J. SEAMAN
BY
Christopher L. Waal
ATTORNEY

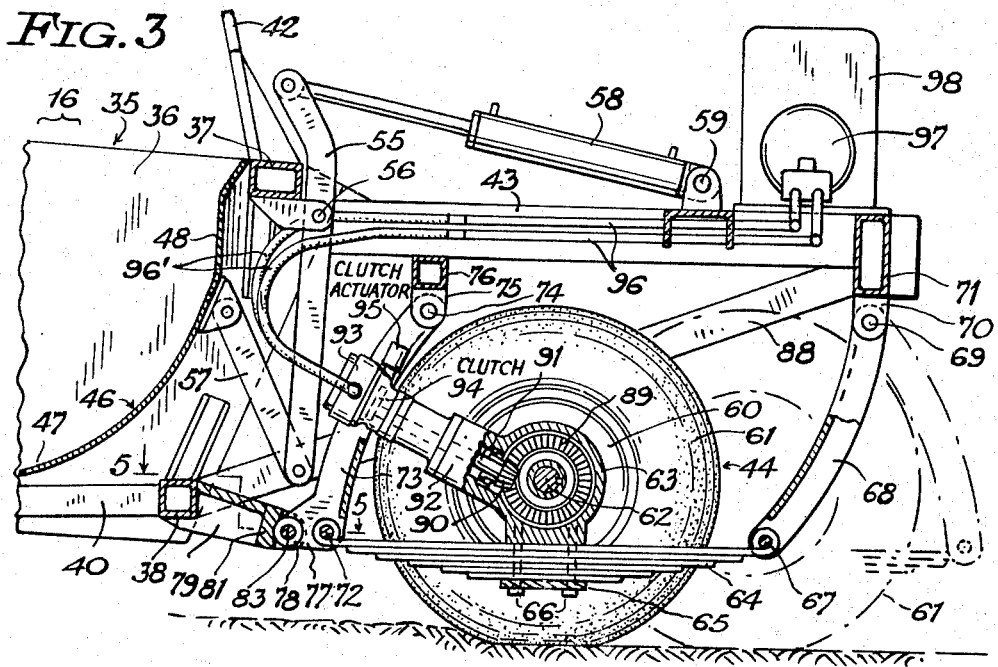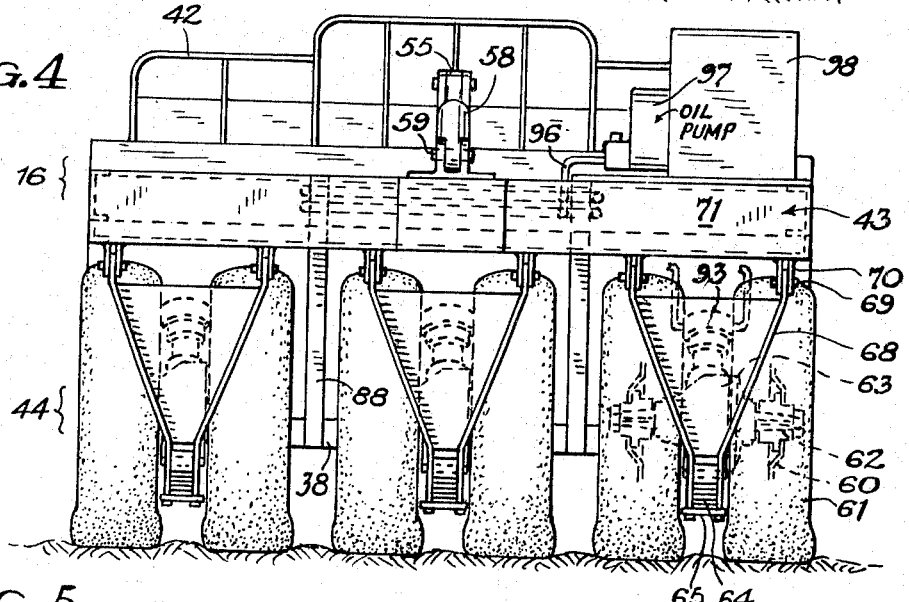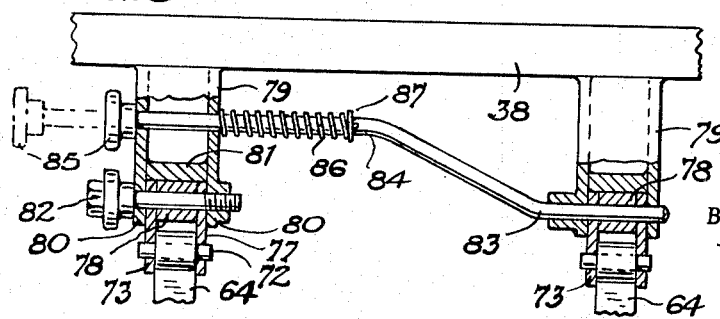

United States Patent Office 3,316,822
Patented May 2, 1967

3,316,822
COMBINED EARTH MOVER AND COMPACTOR
Harry J. Seaman, Milwaukee, Wis.; Ann Seaman and American City Bank and Trust Company, executors of said Harry J. Seaman, deceased, assignors to Seaman Corporation, a corporation of Wisconsin
Filed Mar. 12, 1964, Ser. No. 351,464
7 Claims. (Cl. 94—50)

The present invention relates to heavy-duty vehicles and more particularly to combined earth movers and compactors.

Cross reference is made to my copending United States patent application Ser. No. 274,621, filed Apr. 22, 1963, now U.S. Patent 3,224,347.

An object of the invention is to provide an improved earth mover or carry-type scraper which is supported at its rear by a pneumatic-tired compaction roll, thus not only providing a dual-function machine but also effecting compaction of earth unloaded and spread by the machine during its travel, the earth load carried by the machine forming ballast to increase the pressure on the compaction roll.

Another object is to provide an earth working vehicle of this character including power means for driving the pneumatic-tired compaction roll to increase the digging power and tractive effect.

Still another object is to form the compaction roll of the vehicle by a bank of closely spaced pneumatic tires which are so mounted and arranged as to facilitate access to the tires for inflation and servicing.

A further object is to provide an improved earth moving and compacting machine of simple, reliable and inexpensive construction.

The invention further consists in the several features hereinafter described and claimed.

In the drawings,

FIG. 3 is a vertical sectional view taken generally on the line 3—3 of FIG. 2, a rearwardly displaced position of compaction roll tires being shown in broken lines;

FIG. 4 is a rear elevational view of the machine, and

FIG. 5 is a detail sectional view taken generally on the line 5—5 of FIG. 3.

Figure 1:
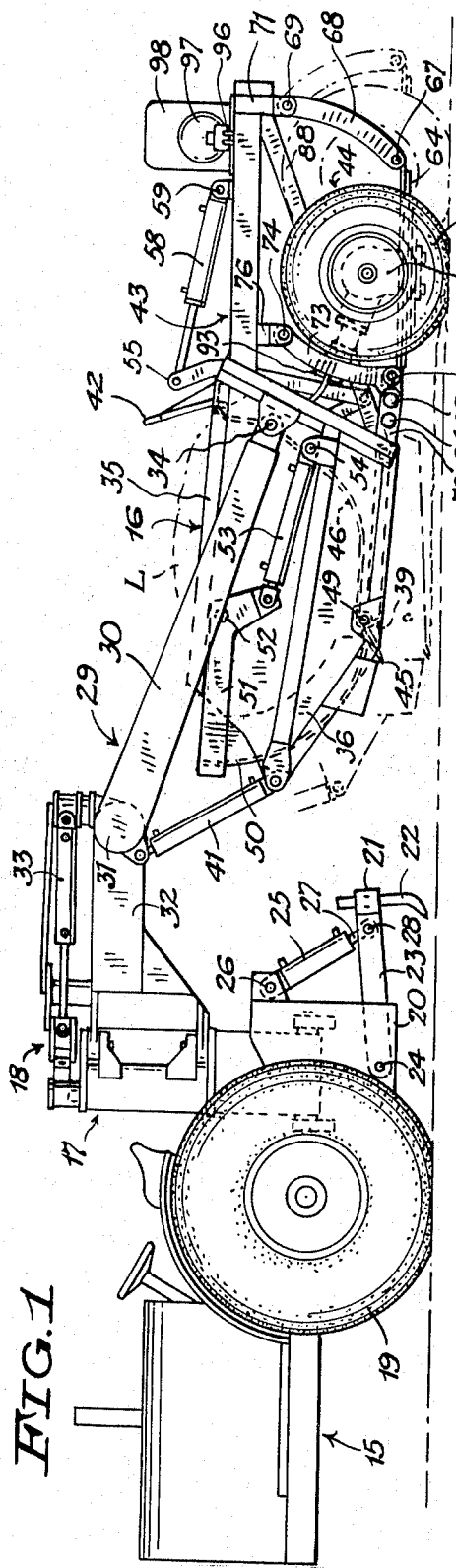
FIG. 1 is a left hand side elevational view of a combined earth mover and compactor constructed in accordance with the invention, the machine being shown in full lines in load-carrying position, and a spreading position of the scraper bowl of the machine being shown in broken lines.
Figure 2:
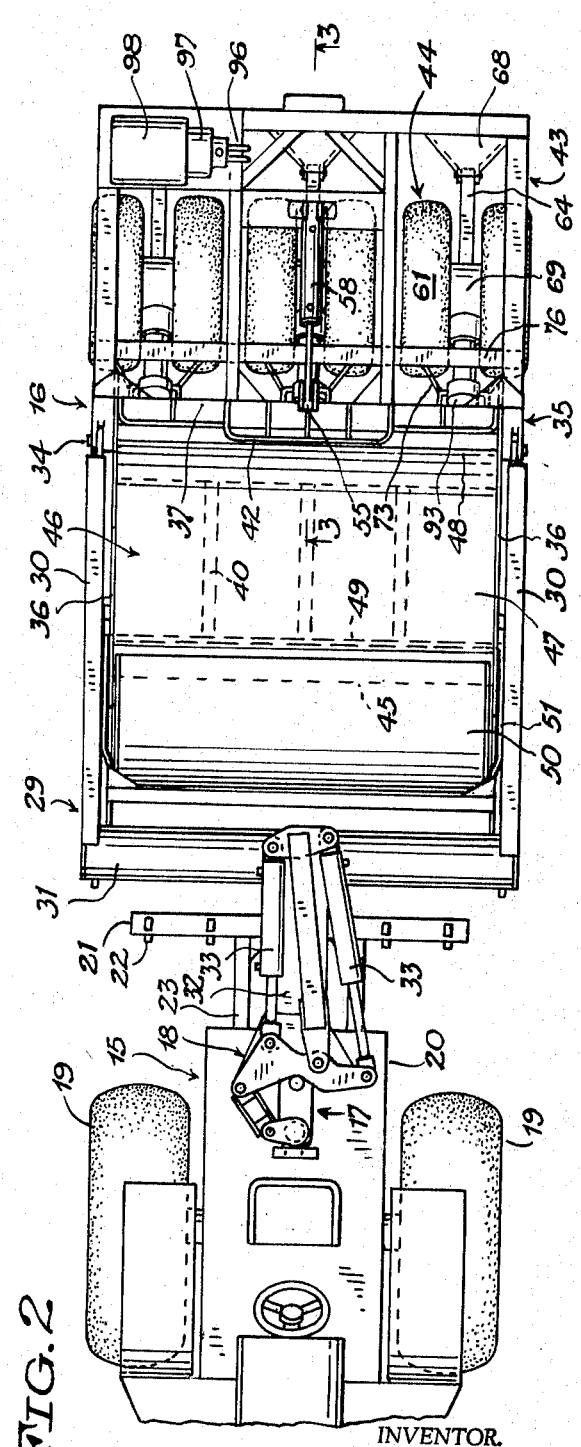
FIG. 2 is a top plan view of the machine.

Referring to the drawings, the earth working machine shown therein is in the form of an articulated wheeled vehicle comprising a tractor unit 15 and a trailer unit 16 joined by a hitch 17 and provided with a sutiable short-turn steering mechanism 18, such as of the hydraulic type.

The tractor unit 15 is of a conventional two-wheel type provided with large-diameter pneumatic-tired wheels 19 disposed at opposite sides of its frame 20. The machine preferably includes scarifying means here shown to be mounted on the tractor unit and to comprise a transversely extending scarifier beam 21 carrying laterally spaced scarifier teeth 22. The scarifier beam is rigidly attached to the rear ends of vertically swingable supporting arms 23, the front ends of which are pivotally secured at 24 on the rear portion of the tractor frame to turn about a transverse horizontal axis. The scarifier beam is raised and lowered by a hydraulic cylinder or jack 25 having its upper end pivotally secured at 26 to the tractor frame and having its piston rod 27 pivotally secured at 28 to the beam.

The trailer unit 16 is provided with the usual draft yoke 29 including spaced parallel side arms 30 rigidly connected at their front ends to the opposite ends of a tubular cross beam 31. The draft yoke further includes a hollow horizontal gooseneck 32 rigidly welded at its rear end to the middle portion of the tubular cross beam 31 and projecting forwardly therefrom along the longitudinal center line of the trailer unit, the front end of the gooseneck forming a part of the tractor hitch 17. The hydraulic steering mechanism 18 includes cylinders 33 pivotally connected at their rear ends to the rear portion of the gooseneck.

The draft yoke side arms 30 slope rearwardly and downwardly and have aligned pivotal connections 34 at their rear ends with the outer sides of the rear portion of a scraper bowl frame 35, the pivotal axis extending horizontally and transversely of the bowl frame. The bowl frame comprises parallel vertical side panels 36 which are suitably reinforced and are rigidly connected at their rear portions by upper and lower hollow cross beams 37 and 38 and at their lower portions by a forward cross member 39, the latter being rigidly connected to the rear lower cross beam by bottom tie bars or struts 40 extending longitudinally of the frame. The front ends of the bowl frame side panels are suspended from the cross beam 31 of the draft yoke by the usual hydraulic cylinders or jacks 41, permitting the front of the bowl frame to be raised and lowered. The upper rear cross beam 37 carries an upstanding guard 42. The bowl frame includes a rear extension frame structure 43 which is rigidly connected to the upper and lower cross beams 37 and 38 and is supported by a pneumatic-tired compaction roll 44 as hereinafter described.

The bowl frame forms part of a conventional bowl structure open at its front end and including a transversely extending cutting or digging blade 45 at its open front end rigidly secured to the cross member 39. A curved ejector 46 forms a bowl floor 47 and a bowl back wall 48 and has a front hinge connection 49 along the cutting blade. The usual swingable apron 50 closes the front of the bowl structure during transport travel of the loaded machine and is carried by the front ends of bell-crank levers 51, FIG. 1, pivotally secured at 52 at the outer sides of the bowl frame, these levers being connected to respective hydraulic cylinders or jacks 53 having their rear ends pivotally mounted on the bowl frame at 54 for raising and lowering the apron. The ejector is actuated by any suitable mechanism, here shown to include a rock lever 55, FIG. 3, pivoted at 56 on the upper cross beam 37 of the bowl frame and having its lower end connected to the back wall of the ejector by a link 57. The rock lever is oscillated by an hydraulic cylinder or jack 58 extending rearwardly of the bowl along the longitudinal central plane of the machine and having a pivotal mounting 59 at its rear end on the rear extension 43 of the bowl frame.

The rear portion of the trailer unit is supported by the ground-engaging compaction roll 44 which comprises a group or bank of at least three pairs of transversely aligned laterally spaced wheels 60 with respective pneumatic tires 61. Three pairs of wheels are shown but in some instances more may be provided. The wheels in each pair are carried on the opposite ends of a horizontal axle shaft 62 mounted in a housing 63 disposed between the spaced wheels. Each housing is rigidly secured at its lower side to the middle portion of a laminated beam-forming leaf spring 64 extending longitudinally of the trailer, the spring being rigidly secured to the housing by a bottom clamping plate 65 fastened by stud bolts 66, FIG. 3. The rear end of each leaf spring is secured by a pivot pin 67 to the lower end of an inclined downwardly convergent V-shaped link or shackle 68, and the wide upper end of each link is secured by axially spaced aligned pivot pins 69 to depending ears 70 attached to a horizontal rear cross beam 71 of the bowl frame extension 43, the upper pivot pins 69 being rearward of the pivoted rear end of the spring. The front end of each leaf spring is secured by a pivot pin 72 to the lower end of a normally stationary inclined V-shaped link or shackle 73 generally similar to the links 68, and the wide upper end of each link 73 is secured by aligned pivot pins 74 to depending ears 75 attached to a cross beam 76 of the bowl frame extension, the upper pivot pins 74 being rearward of the pivoted front end of the spring, and the distance between the upper pivot pins 69 and 74 being approximately equal to the distance between the front and rear spring pivot pins 67 and 72. Each spring and the two spring-supporting links 68 and 73 thus form parts of a parallelogram linkage. The lower ends of the front links 73 are detachably anchored to the lower portion of the bowl frame, as best seen in FIGS. 3 and 5. In the present instance, the lower end of each front link is provided with a front projection comprising a pair of apertured forwardly projecting ears 77 rigidly joined by an intervening tubular spacer 78. Three laterally spaced backets 79 are welded to the lower cross beam 38 of the bowl frame and project rearwardly therefrom in alignment with the wheel-supporting springs 64, the rear end of each bracket having laterally spaced apertured ears 80 which embrace the apertured front projection 77, 78 of the lower end of the corresponding front link or shackle 73. The bracket also includes a transverse abutment portion 81 against which the link projection 77, 78 is normally seated. When a wheel unit or set is in its normal forward position, as shown in full lines in FIG. 3, the pivot pins 72, 67 by which the spring 64 is connected to the links 73, 68 are respectively ahead of the pivot pins 74, 69 by which the said links are connected to the frame cross beams 76, 71. Accordingly, the weight of the frame and load exert a component of force biasing the wheel unit forwardly to engage the lower end of link 73 against the fixed abutment 81 on bracket 79 and bear the weight of the frame and load. The link projection may be detachably secured to the bracket 79 in various ways. In the present instance, the front link 73 for the spring of each outer dual-wheel unit is secured to the associated bracket 79 by a threaded knob-ended bolt 82, and the front link for the spring of the intermediate dual-wheel unit is secured to the middle bracket 79 by a spring-urged latch bolt 83. The latch bolt has an offset end portion 84 slidably mounted for limited axial movement in one of the outer brackets 79 and is provided with a terminal manipulating knob 85. A compressed coiled spring 86 surrounds the latch bolt portion 84 and is confined between the inner face of the bracket and a stop member 87 on the bolt. By pulling out the latch bolt to the dotted line position of FIG. 5, the intermediate front link 73 will be free for release from the intermediate bracket. The latch bolt can be temporarily held in its released position in any suitable manner, as by a blocking member or spacer, not shown, disposed between the outwardly displaced knob 85 and the bracket.

The rear frame extension 43 is here shown to include inclined bars or struts 88 which connect the lower cross beam 38 of the bowl frame with the rear cross beam 71 of the frame extension, the bars 88 extending in the narrow spaces between the dual-wheel units.

In the present instance, the shaft housing 63 for each dual-wheel unit or set forms a drive housing, the associated axle shaft 62 being journalled therein and having its opposite ends fixed to the associated pair of wheels 60. The shaft has keyed thereto a bevel gear 89, FIG. 3, which meshes with a bevel pinion 90 carried on a drive shaft 91. The drive shaft extends in a narrow housing extension 92 which is disposed between the closely spaced pneumatic-tired wheels and is inclined forwardly and upwardly. The front end of each housing extension carries an hydraulic motor 93 which is connected to the drive shaft, preferably through a clutch 94, such as an over-running clutch or a jaw clutch. The clutch is normally released but is shiftable to engaged position, as by means of a remotely-controlled actuator 95. By way of example, the actuator may be an hydraulic device operable by oil pressure whenever oil under pressure is supplied to the motor. The several hydraulic motors are supplied with oil under pressure through a conduit system 96 including flexible hose portions 96' leading to the motors, so as to accommodate deflection and tilting of the resiliently mounted roll-forming wheels and to accommodate longitudinal shifting of the wheel units or sets for servicing. The oil may be supplied either from the hydraulic system of the tractor unit or from a pump 97 forming a part of a remotely controlled engine-driven hydraulic pump unit 98 carried on the rear frame extension 43. The front links or shackles 73 are suitably apertured to provide clearance for the hydraulic motors.

Each of the several individually sprung dual-wheel units forming the compaction roll is capable of a limited lateral tilting action under the torsional restraint of the associated leaf spring 64. The roll-forming trailer-supporting wheels 61 may revolve idly during compaction rolling or during road transport, or they may be power-driven at will by the hydraulic motors 93 to increase the cutting or digging power during loading and to augment the tractive effort on the machine, as when operating on upgrades and in muddy ground.

When the machine is to be loaded, the ejector 46 is retracted, the apron 50 is raised and the scraper bowl is lowered to earth-cutting position, as usual. The machine is propelled forwardly by the tractor unit, causing the cutting blade to scrape the earth and to force it into the bowl, forming an earth load L, FIG. 1. In some instances, the scarifier 21, 22 may be lowered to effect a preliminary breaking up of hard ground or bituminous surface material. Also, if additional cutting or digging power is needed, the hydraulic motors 93 of the pneumatic-tired compaction roll are energized. After the bowl is loaded, the apron 50 is lowered to closed position and the bowl is raised to transport position, as seen in FIG. 1. When the deposit area is reached, the apron of the traveling scraper is raised and the ejector is swung forwardly, thus dumping the contents of the bowl. For quick dumping the apron is raised to its full height and the ejector is advanced rapidly. Instead of providing a quick dumping operation, it is often desirable to spread the discharged earth into a layer of selected thickness as the machine travels forwardly. For this operation the cutting blade 45 of the bowl is placed at the desired elevation above the ground surface to form a strike-off, the apron is raised a suitable distance, and the ejector is gradually swung forwardly, thus causing a layer of the loose earth to be deposited on the ground surface. This layer of material is then densely compacted and kneaded by the closely spaced pneumatic tires of the trailing compaction roll which is ballasted by the remaining earth load in the bowl. The compaction roll seals in moisture, prevents rutting, and avoids the need for a separate compactor. In some instances, the compaction roll may make additional passes over the deposited layer of material.

In another method of operation, the machine may be used to roll or compact a previously deposited layer of earth before the earth load is dumped, the load temporarily remaining in the scraper bowl to form ballast substantially increasing the pressure on the compaction roll.

When inflation or servicing of one of the intermediate tires is required, the lower end of the associated front link 73 is disconnected from the cooperating bracket 79. The dual-wheel unit is then displaced relatively rearwardly a considerable distance to the dotted line position shown in FIGS. 1 and 3 for convenient access to the tire, the rearward displacement of the tire being preferably greater than the tire radius, and the normal and displaced positions of each spring-end pivot pin being spaced approximately equal distances from the vertical plane through the corresponding frame-attached pivot pin so as to maintain the vertical spacing between the upper and lower pivot pins for the links. The relative rearward shift of the dual-wheel unit can be effected in any suitable manner, as by blocking the released wheel unit and moving the vehicle forwardly a short distance. As soon as the pivot pins 72, 67 on spring 64 pass vertically below the pivot pins 74, 69, the weight of the frame and load will exert a component of force on the wheel unit biasing it toward its dotted line position shown in FIG. 3 in which the retracted unit is freed of the weight of the frame and load, which continues to be borne by the other two units which are still in their forward load-bearing positions. Accordingly, the wheel unit which is thus shifted fore and aft goes through an over-center position at one side of which it is biased forwardly to a load-bearing position and at the other side of which it is biased to a service position. The wheel unit can be restored to its normal position by a similar reversed operation. The forwardly looped flexible hose portions 96' of the hydraulic lines accommodate the rearward shift of the several wheel units.

I claim:

1. In an earth working machine, a carry-type scraper vehicle including a frame structure and an earth digging and carrying bowl with earth ejecting means for depositing a layer of earth from said bowl onto a ground surface during the forward travel of the machine, a pneumatic-tired compaction roll supporting said frame structure at the rear of said bowl, said roll comprising a bank of closely spaced pneumatic-tired wheels arranged in plural sets of independently mounted wheel pairs, said wheels having a compacting action on the layer of earth deposited on the ground surface, and power means for independently driving each said set of wheel pairs.

2. In an earth working machine, a carry-type scraper vehicle including a frame structure and an earth digging and carrying bowl with earth ejecting means, a pneumatic-tired compaction roll supporting said frame structure at the rear of said bowl, said compaction roll comprising a plurality of dual tire wheel units providing a bank of closely spaced pneumatic-tired wheels, and a like plurality of hydraulic wheel-driving motors carried by said wheel units and means for independently driving respective units from their respective motors.

3. In an earth working machine, a vehicle including a frame structure and a pneumatic-tired compaction roll supporting said frame structure at the rear thereof, said compaction roll comprising a plurality of wheel units providing a bank of closely spaced pneumatic-tired wheels, linkage means connecting each wheel unit to said frame and guiding said wheel unit for fore-and-aft displacement between a normal forward load-bearing position and an alternative rearward position, and releasable retaining means holding each wheel unit in its normal forward position, said retaining means when released permitting relative shifting of the associated wheel unit to its rearward position while the weight of the vehicle continues to be borne by the other wheel units, whereby to facilitate servicing of the rearwardly displaced wheel unit.

4. In an earth working machine, a vehicle including a frame structure and a pneumatic-tired compaction roll supporting said frame structure at the rear thereof, said compaction roll comprising a plurality of wheel units providing a bank of closely spaced pneumatic-tired wheels, linkage means connecting each wheel unit to said frame and guiding said wheel unit for fore-and-aft displacement between a normal forward position and an alternative rearward position, hydraulic wheel-driving motors carried by said wheel units, and releasable retaining means holding each wheel unit in its normal forward position with respect to said frame structure, said retaining means when released permitting relative shifting of the associated wheel unit to its rearward position while the weight of the vehicle continues to be borne by the other wheel units, whereby to facilitate servicing of the rearwardly displaced wheel unit.

5. In an earth working machine, a vehicle including a frame structure and a pneumatic-tired compaction roll supporting said frame structure at the rear thereof, said compaction roll comprising a plurality of wheel units providing a bank of closely spaced pneumatic-tired wheels, linkage means connecting each wheel unit to said frame structure and guiding said wheel unit for fore-and-aft displacement between a normal forward position and an alternative rearward position, the linkage means for each wheel unit including front and rear links having their upper ends pivotally connected to said frame structure and a leaf spring pivotally connecting the lower ends of said links, and releasable retaining means for holding each wheel unit in its normal forward position with respect to said frame structure, said retaining means when released permitting relative rearward shifting of the associated wheel unit to its rearward position.

6. In an earth working machine, a vehicle including a frame structure and a pneumatic-tired compaction roll supporting said frame structure at the rear thereof, said compaction roll comprising a plurality of wheel units providing a bank of closely spaced pneumatic-tired wheels, linkage means connecting each wheel unit to said frame structure and guiding said wheel unit for fore-and-aft displacement between a normal forward position and an alternative rearward position, the linkage means for each wheel unit including generally parallel front and rear links having their upper ends pivotally connected to said frame structure and a leaf spring pivotally connecting the lower ends of said links, said linkage means forming a linkage of generally parallelogram configuration and the lower end of each link being normally disposed forward of the upper end of said link, and releasable retaining means for holding each wheel unit in its normal forward position with respect to said frame structure, said retaining means when released permitting relative rearward shifting of the associate wheel unit to its rearward position.

7. In an earth working machine, a vehicle including a frame structure and a pneumatic-tired compaction roll supporting said frame structure, said compaction roll comprising a plurality of wheel units providing a bank of closely spaced pneumatic-tired wheels, and linkage means displaceable in a fore-and-aft direction through an intermediate over-center position and individually connecting said wheel units to said frame structure for movement between a normal forward load-bearing position ahead of said over-center position and an alternative rearward position behind said over-center position, load-bearing abutment means against which said linkage means abuts in its normal forward position and means for releasably retaining each wheel unit in its normal forward position.

References Cited by the Examiner

UNITED STATES PATENTS

| 2,103,588 | 12/1937 | Le Bleu | 37—124 |
| 2,182,670 | 12/1939 | Le Bleu | 37—126 |
| 2,336,814 | 12/1943 | Suter | 94—50 |
| 2,739,517 | 3/1956 | Roberts | 94—50 X |
| 2,745,328 | 5/1956 | Brimhall | 172—7 |
| 2,978,967 | 4/1961 | MacDonald | 94—50 |
| 3,229,602 | 1/1966 | Vivier | 94—50 |

CHARLES E. O'CONNELL, *Primary Examiner.*

N. C. BYERS, *Assistant Examiner.*